United States Patent
Mitchell et al.

(10) Patent No.: US 10,482,570 B2
(45) Date of Patent: Nov. 19, 2019

(54) MEMORY ALLOCATION FOR SEAMLESS MEDIA CONTENT PRESENTATION

(71) Applicant: Disney Enterprises, Inc., Burbank, CA (US)

(72) Inventors: Kenneth J. Mitchell, Glendale, CA (US); Charalampos Koniaris, Glasgow (GB); Floyd M. Chitalu, Midlothian (GB)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/716,234

(22) Filed: Sep. 26, 2017

(65) Prior Publication Data

US 2019/0096028 A1 Mar. 28, 2019

(51) Int. Cl.
*G06T 1/60* (2006.01)
*G06T 1/20* (2006.01)
*G06F 12/0802* (2016.01)
*G02B 27/01* (2006.01)

(52) U.S. Cl.
CPC ............ *G06T 1/60* (2013.01); *G06F 12/0802* (2013.01); *G02B 2027/014* (2013.01); *G06T 1/20* (2013.01)

(58) Field of Classification Search
CPC ......... G06T 1/60; G06T 1/20; G06F 12/0802; G06F 3/0484; G06F 3/017; G06F 3/1454; G06F 3/0425; G02B 2027/014; H04N 19/17; H04N 19/132; H04N 19/60; H04N 19/176

See application file for complete search history.

(56) References Cited

U.S. PATENT DOCUMENTS

| | | | | |
|---|---|---|---|---|
| 2004/0104935 A1* | 6/2004 | Williamson | ............ | G06F 3/012 715/757 |
| 2004/0153970 A1* | 8/2004 | Shinoda | ............. | H04N 1/00132 715/273 |
| 2006/0061577 A1* | 3/2006 | Subramaniam | ....... | G06T 15/005 345/501 |

(Continued)

OTHER PUBLICATIONS

"Light Fields • OTOY." *OTOY*, home.otoy.com/render/light-fields/. Web. Nov. 27, 2017. pp. 1-3.

(Continued)

*Primary Examiner* — Saptarshi Mazumder
(74) *Attorney, Agent, or Firm* — Farjami & Farjami LLP

(57) ABSTRACT

A system for performing memory allocation for seamless media content presentation includes a computing platform having a CPU, a GPU having a GPU memory, and a main memory storing a memory allocation software code. The CPU executes the memory allocation software code to transfer a first dataset of media content to the GPU memory, seamlessly present the media content to a system user, register a location of the system user during the seamless presentation of the media content, and register a timecode status of the media content at the location. The CPU further executes the memory allocation software code to identify a second dataset of the media content based on the location and the timecode status, transfer a first differential dataset to the GPU memory, continue to seamlessly present the media content to the system user, and transfer a second differential dataset out of the GPU memory.

20 Claims, 4 Drawing Sheets

(56) References Cited

U.S. PATENT DOCUMENTS

| | | | |
|---|---|---|---|
| 2011/0199389 A1* | 8/2011 | Lu .......................... | G06F 3/017 |
| | | | 345/619 |
| 2015/0054727 A1* | 2/2015 | Saboune ................ | G06F 3/016 |
| | | | 345/156 |
| 2017/0147516 A1* | 5/2017 | De .......................... | G06F 3/061 |

OTHER PUBLICATIONS

"What You Need to Know in a Few Videos . . . ", *Nozon*, www.nozon.com/presenz. Web. Nov. 27, 2017. pp. 1-2.

Collet, et al. "High-Quality Streamable Free-viewpoint Video," *ACM Transactions on Graphics (TOG)*, v.34 n.4, Aug. 2015. pp. 1-13.

Merkle, et al. "Depth Intra Coding for 3D Video Based on Geometric Primitives." *IEEE Trans. Circuits Syst. Video Technol*, 2015. pp. 570-582.

Collet, et al. "High-Quality Streamable Free-viewpoint Video— Supplemental Material," *ACM Transactions on Graphics (TOG)*; Aug. 2015. pp. 1-4.

Koniaris, et al. "Real-time Rendering with Compressed Animated Light Fields," *GI 2017 Proceedings of the 43$^{rd}$ Graphics Interface Conference*. Alberta, Canada, May 2017. pp. 1-9.

\* cited by examiner

MEMORY ALLOCATION FOR SEAMLESS MEDIA CONTENT PRESENTATION

BACKGROUND

The growing popularity of Virtual Reality (VR) technologies has resulted in an increase in real-time rendering performance requirements, while concurrently demanding high fidelity and immersive content for viewers. The storage requirements for datasets utilized in VR applications can easily reach tens of Gigabytes, which exceeds the memory capacity of many graphics processing units (GPUs).

SUMMARY

There are provided systems and methods for performing memory allocation for seamless media content presentation, substantially as shown in and/or described in connection with at least one of the figures, and as set forth more completely in the claims.

DETAILED DESCRIPTION

Figure 1:
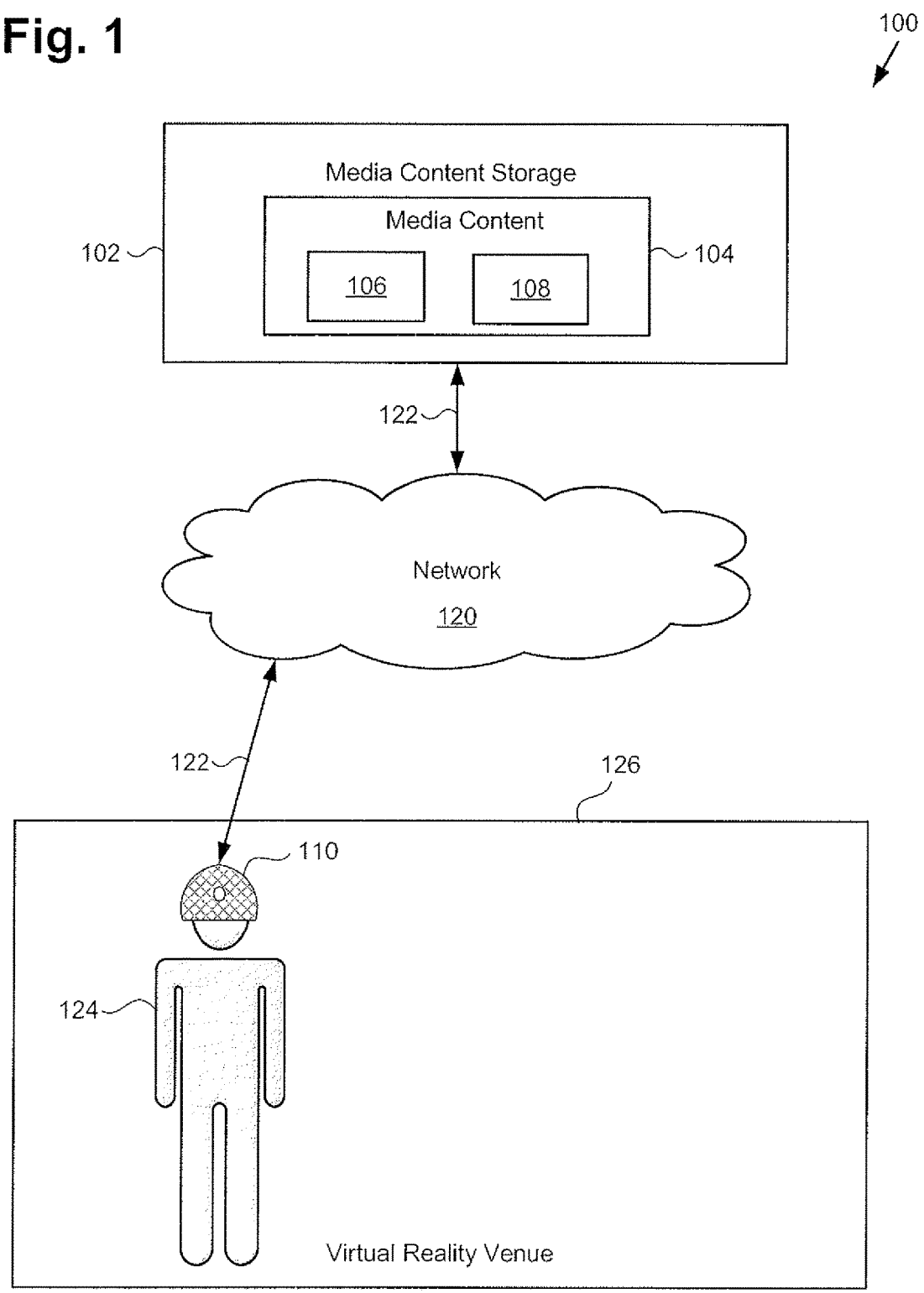
FIG. 1 shows a diagram of an exemplary virtual reality (VR) venue including a system for performing memory allocation for seamless media content presentation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the growing popularity of Virtual Reality (VR) technologies has resulted in an increase in real-time rendering performance requirements, while concurrently demanding high fidelity and immersive content for viewers. The storage requirements for datasets utilized in VR applications can easily reach tens of Gigabytes, which exceeds the memory capacity of many graphics processing units (GPUs). As a result, an important enabling feature of such technologies is the efficient memory allocation for the typically high-bandwidth data that is contained in compressed animated lightfields. Unless that goal is successfully achieved, a user of a VR system may experience an immersive walkthrough that includes lags or latencies incurred due to visual data not being presented when it is visible or imminently visible.

Nevertheless, moving the dynamic datasets encountered in VR applications, datasets that may change frequently due to temporal and/or spatial configurations, for example, remains a challenging problem. For instance, the data transmission bandwidth between the central processing unit (CPU) and GPU may experience bottleneck because the speed of the data bus connecting the CPU and GPU is typically slower than the rate of computation. In addition, the complexities associated with synchronization require special attention.

The present application discloses systems and methods for performing memory allocation for seamless media content presentation that overcome the drawbacks and deficiencies in the conventional art. By transferring a first dataset of media content from media content storage to GPU memory, and utilizing the first dataset to begin presentation of the media content to a system user, the present solution ensures that GPU memory resources are not overwhelmed. Moreover, by identifying a second dataset of the media content based on a location of the system user, as well as the time code status of the media content when the system user is at the location, the present solution ensures that the GPU memory is provisioned with the data needed to provide the system user with a seamless media content presentation. When implemented to provide a VR experience to the system user, for example, the present solution can advantageously support an arbitrary number of viewpoints for reconstructing three-dimensional (3D) scenes accurately and from substantially any point of view.

FIG. 1 shows a diagram of exemplary VR venue 126 including system 110 for performing memory allocation for seamless media content presentation, according to one exemplary implementation. According to the implementation shown in FIG. 1, media content presentation system 110 may take the form of a wearable device, such as a head mounted VR viewer, for example. In addition, FIG. 1 shows system user 124 and media content storage 102 storing media content 104. Also shown in FIG. 1 are first dataset 106 and second dataset 108 of media content 104.

As further shown in FIG. 1, in one implementation, media content presentation system 110 may be interactively linked to media content storage 102 by communication network 120 and network communication links 122. In one such implementation, media content storage 102 may be a cloud based media content storage resource corresponding to one or more web servers accessible over a packet-switched network such as the Internet, for example. Alternatively, media content storage 102 may correspond to one or more servers supporting a local area network (LAN), or included in another type of limited distribution network.

According to the exemplary implementation shown in FIG. 1, system user 124 may utilize media content presentation system 110 to enjoy a VR experience in VR venue 126. For example, system user 124 may utilize media content presentation system 110 by wearing or carrying media content presentation system 110 to walk through or otherwise traverse VR venue 126. According to implementations of the present inventive concepts, media content presentation system 110 is configured to provide system user 124 with a high fidelity, immersive VR experience, without significant latency, using media content 104.

Media content 104 may take a variety of forms, depending upon the implementational details or use case for media content presentation system 110. For example, in some implementations, media content 104 may include audiovisual content and/or haptic content. Moreover, in some implementations, media content 104 may include high-definition (HD) video, or ultra HD video, such as 2K or 4K video. In addition, in implementations in which media content presentation system 110 takes the form of a VR viewer, media content 104 may include 3D video.

As a specific example, in implementations in which media content presentation system 110 takes the form of a VR viewer, media content 104 may include full motion lightfield video (FMLV). In such an implementation, for each video frame of media content 104, a set of 360-degree images per frame (color and depth) may be generated using a subset of predetermined camera viewpoints corresponding to VR venue 126. That is to say, media content 104 may include video content contributed by multiple video cameras.

It is noted that media content 104 may be partitioned into first dataset 106 and second dataset 108. However, it is emphasized that the depiction of first and second datasets 106 and 108 is merely exemplary. In other implementations, media content 104 may be partitioned into more than the two datasets shown in FIG. 1.

Figure 2:
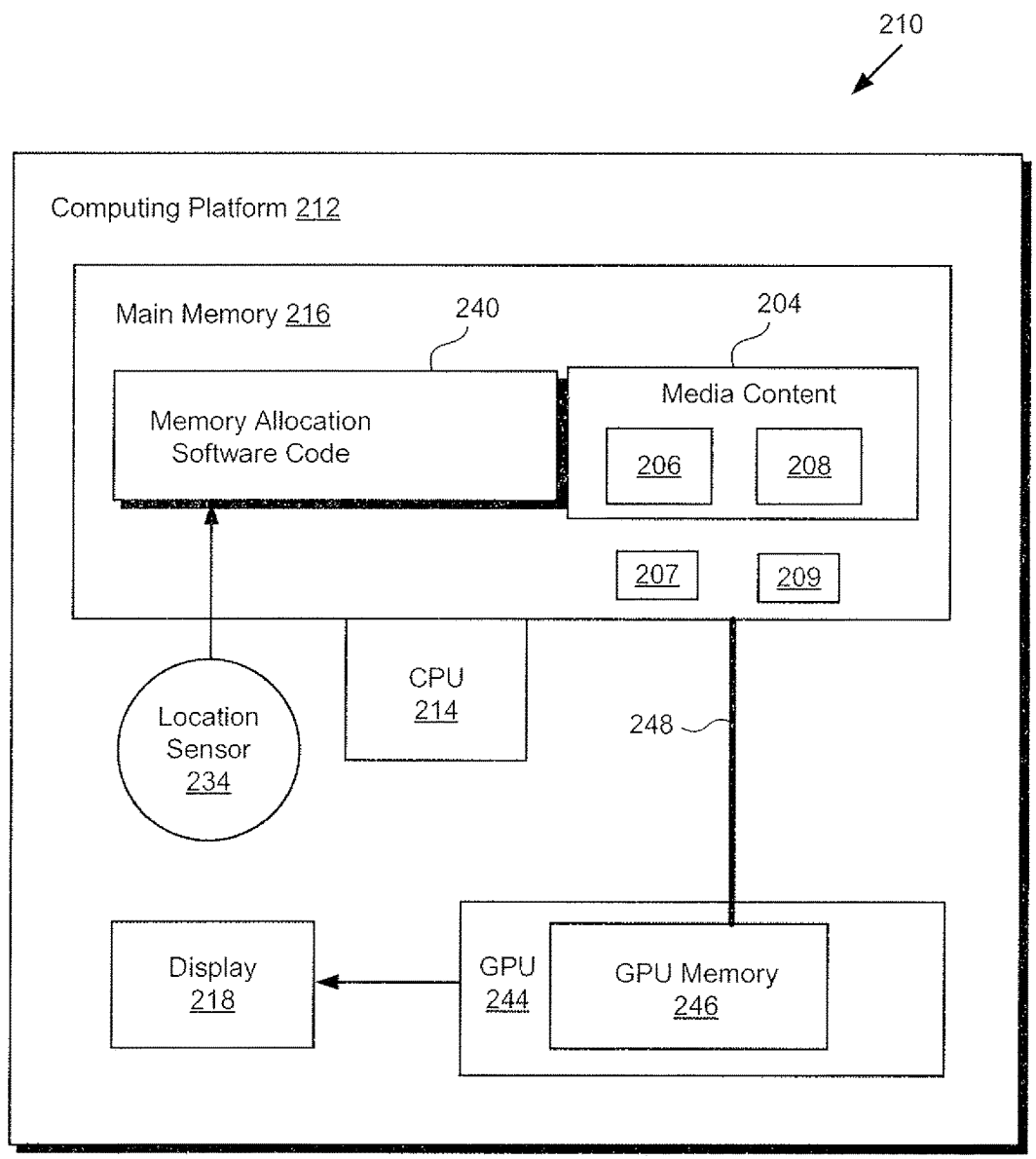
FIG. 2 shows a more detailed block diagram of an exemplary system for performing memory allocation for seamless media content presentation, according to one implementation.

FIG. 2 shows a more detailed block diagram of exemplary system 210 for performing memory allocation for seamless media content presentation, according to one implementation. As shown in FIG. 2, media content presentation system 210 includes computing platform 212 having CPU 214 implemented as a hardware processor, and main memory 216 implemented as a non-transitory storage device. According to the present exemplary implementation, main memory 216 stores memory allocation software code 240, and may further store media content 204 including first dataset 206 and second dataset 208, as well as first differential dataset 207 and second differential dataset 209. Also shown in FIG. 2 are display 218, location sensor 234, GPU 244 including GPU memory 246, and data bus 248 linking main memory 216 and GPU memory 246.

Media content presentation system 210 and media content 204 including first dataset 206 and second dataset 208 correspond respectively in general to media content presentation system 110 and media content 104 including first dataset 106 and second dataset 108, in FIG. 1, and those corresponding features may share any of the characteristics attributed to either corresponding feature by the present disclosure. In other words, media content presentation system 110 may include features corresponding respectively to computing platform 212, main memory 216, CPU 214, GPU 244 including GPU memory 246, location sensor 234, display 218, and memory allocation software code 240.

It is noted that, in contrast to the exemplary implementation shown in FIG. 1, media content 204 is stored in main memory 216 of media content presentation system 210. Thus, according to the implementation shown in FIG. 2, main memory 212 serves as a local substitute for media content storage 102. It is also noted that in other implementations, media content storage 102 may take the form of another storage resource, such as an internal hard drive of computing platform 212, or an external hard drive accessible by computing platform 212. It is further noted that display 218 may take the form of a liquid crystal display (LCD), a light-emitting diode (LED) display, an organic light-emitting diode (OLED) display, or another suitable display screen that performs a physical transformation of signals to light.

Figure 3:
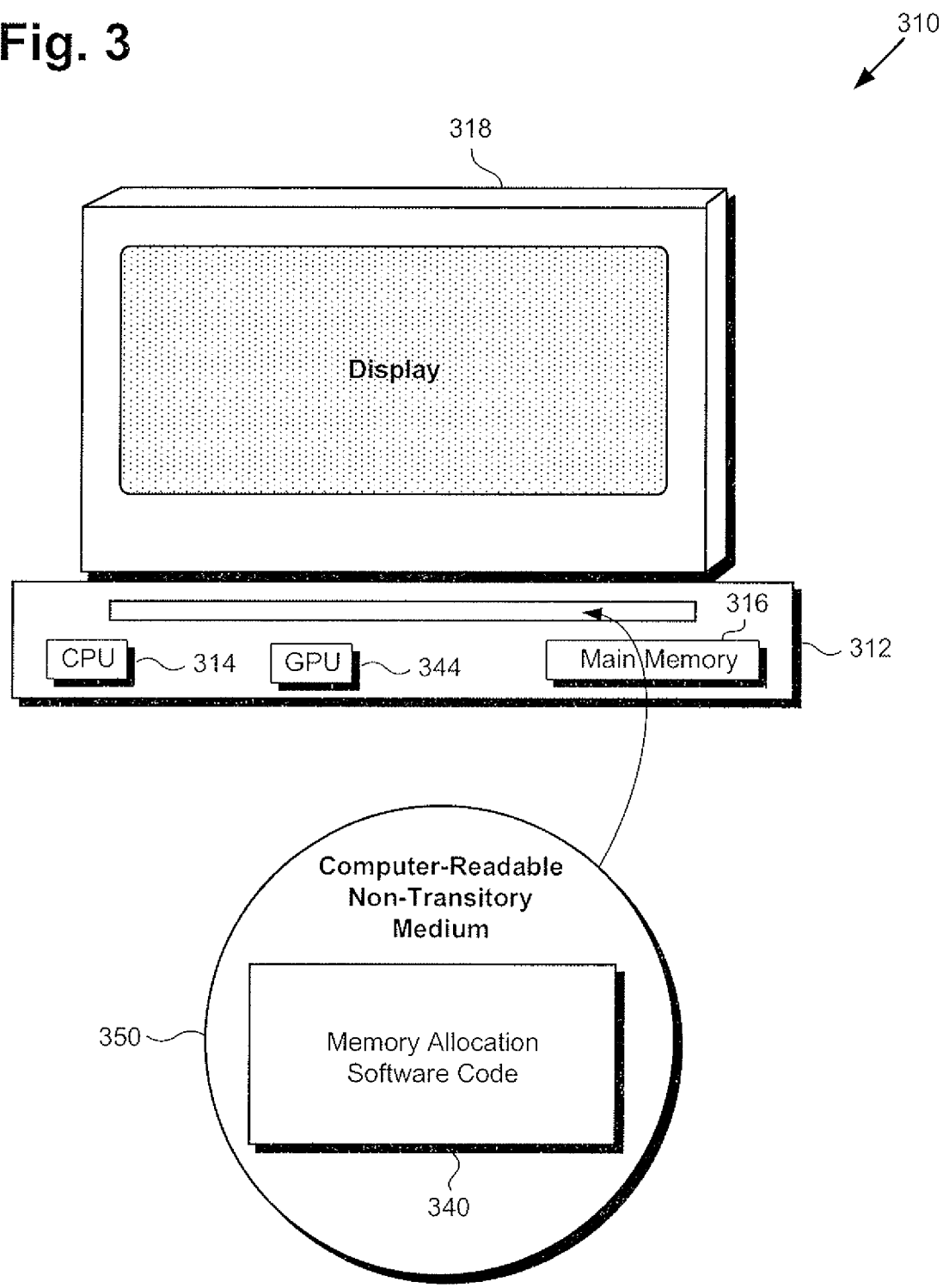
FIG. 3 shows an exemplary system and a computer-readable non-transitory medium including instructions for performing memory allocation for seamless media content presentation, according to one implementation.

FIG. 3 shows exemplary system 310 and a computer-readable non-transitory medium including instructions for performing memory allocation for seamless media content presentation, according to one implementation. System 310 includes computing platform 312 having CPU 314, GPU 344, and main memory 316, interactively linked to display 318. Display 318 may take the form of an LCD, LED display, an OLED display, or another suitable display screen that performs a physical transformation of signals to light.

System 310 including computing platform 312, CPU 314, GPU 344, main memory 316, and display 318 corresponds in general to media content presentation system 110, in FIG. 1, and those corresponding features may share any of the characteristics attributed to either corresponding feature by the present disclosure. Furthermore, system 310 corresponds in general to media content presentation system 210, in FIG. 2. Consequently, system 310 may share any of the characteristics and may perform any of the actions attributed to corresponding media content presentation system 110/210 by the present disclosure.

Also shown in FIG. 3 is computer-readable non-transitory medium 350 having memory allocation software code 340 stored thereon. The expression "computer-readable non-transitory medium," as used in the present application, refers to any medium, excluding a carrier wave or other transitory signal, that provides instructions to CPU 314 of computing platform 312. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 350 provides memory allocation software code 340 for execution by CPU 314 of computing platform 312. Memory allocation software code 340 corresponds in general to memory allocation software code 240, in FIG. 2, and is capable of performing all of the operations attributed to that corresponding feature by the present disclosure.

Figure 4:
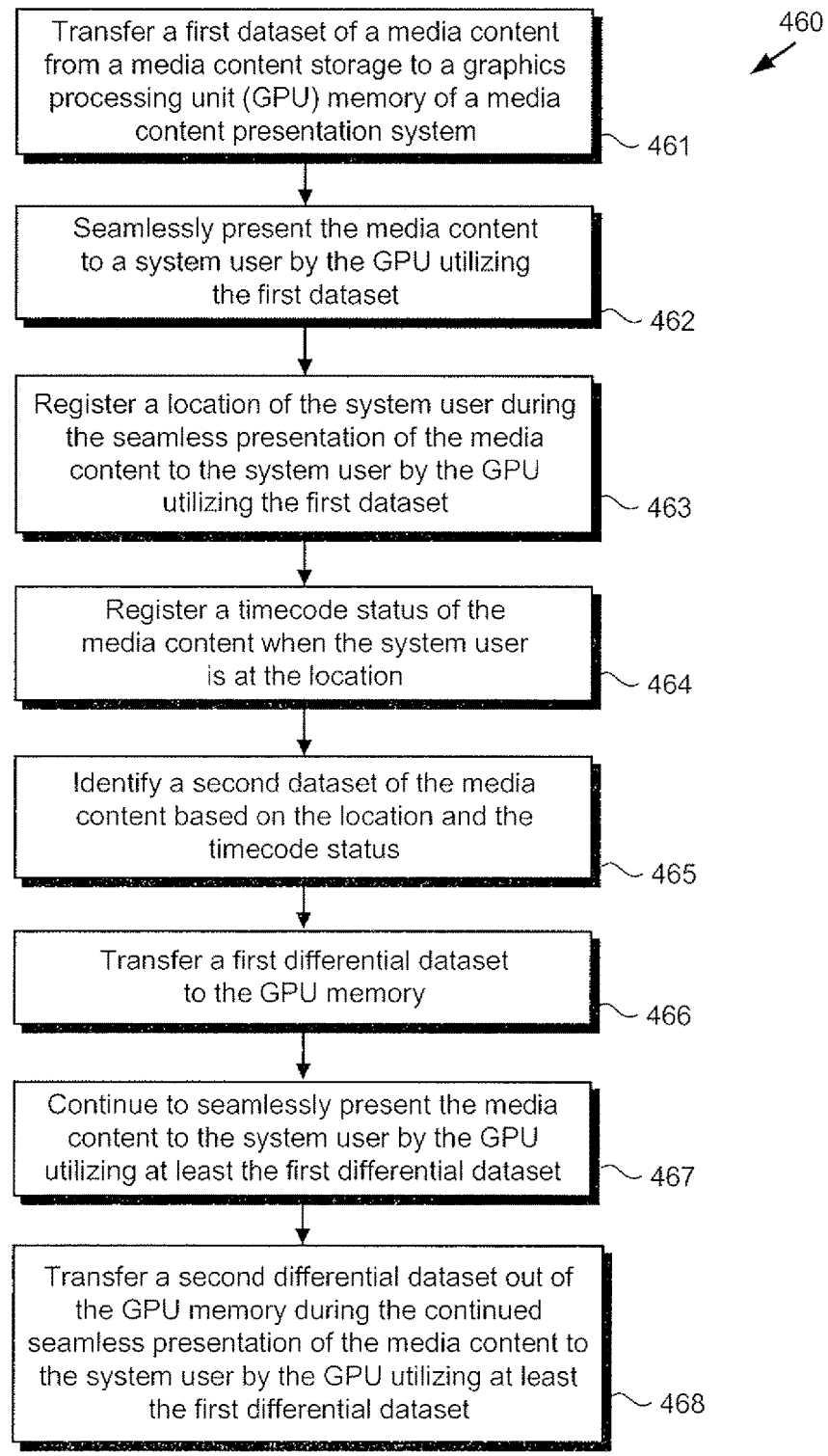
FIG. 4 shows a flowchart presenting an exemplary method for performing memory allocation for seamless media content presentation, according to one implementation.

The functionality of memory allocation software code 240/340 will be further described by reference to FIG. 4 in combination with FIGS. 1, 2, and 3. FIG. 4 shows flowchart 460 presenting an exemplary method for use by a system, such as media presentation system 110 and 210, in respective FIGS. 1 and 2, or system 310, in FIG. 3, to perform memory allocation for seamless media content presentation.

Flowchart 460 begins with transferring first dataset 106/206 of media content 104/204 from a media content storage to GPU memory 246 of media content presentation system 110/210/310 (action 461). By way of example, in one implementation, as shown in FIG. 1, media content presentation system 110 may interact with remote media content storage 102 in order to transfer first dataset 106 to GPU memory 246 via communication network 120 and network communication links 122.

However, in another implementation, as shown in FIG. 2, main memory 216 of media content presentation system 210 may serve as a local media content storage for media content 204. First dataset 206 may be transferred to GPU memory 246 from main memory 216 via data bus 248. First dataset 106/206 may be transferred to GPU memory 246 from media content storage by memory allocation software code 240/340, executed by CPU 214/314 of media content presentation system 110/210/310.

Flowchart 460 continues with seamlessly presenting media content 104/204 to system user 124 by GPU 244/344 utilizing first dataset 106/206 (action 462). As noted above, media content 104/204 may include audio-visual content and/or haptic content. For example, in some implementations, media content 104/204 may include HD video, or ultra HD video, such as 2K or 4K video.

As also noted above, in implementations in which media content presentation system 110/210/310 takes the form of a VR viewer, as shown in FIG. 1, media content 104/204 may include 3D video. In such an implementation, first dataset 106/206 may include FMLV in which each video frame includes a set of 360-degree color and depth images generated using a subset of predetermined camera viewpoints corresponding to VR venue 126. Thus, in some implementations, seamlessly presenting media content 104/204 to system user 124 using first dataset 106/206 may correspond to initiating presentation of an immersive VR experience to system user 124 via display 218. The seamless presentation of media content 104/204 to system user 124 by GPU 244/344 utilizing first dataset 106/206 may occur under the control of memory allocation software code 240/340, executed by CPU 214/314 of media content presentation system 110/210/310.

Flowchart 460 continues with registering a location of system user 124 during the seamless presentation of media content 104/204 to system user 124 by GPU 244/344 utilizing first dataset 106/206 (action 463). Registering the location of system user 124 may correspond to receiving and storing a location of system user 124 sensed by location sensor 234 of media content presentation system 110/210/310. Location sensor 234 may be any suitable location sensing feature, and may include one or more of a gyroscope, an accelerometer, and a Global Positioning System (GPS) sensor, for example.

As a specific example, in implementations in which media content presentation system 110/210/310 takes the form of a head mounted VR viewer, as shown in FIG. 1, the location of system user 124 may correspond to the location of system user 124 within VR venue 126. Furthermore, in those implementations, location may include more than merely the spatial location of system user 124. For example, in those implementations, the location of system user 124 may include viewpoint or perspective information, such as the altitude, tilt, and/or rotation of media content presentation system 110. Registering the location of system user 124 during the seamless presentation of media content 104/204 to system user 124 by GPU 244/344 utilizing first dataset 106/206 may be performed by memory allocation software code 240/340, executed by CPU 214/314 of media content presentation system 110/210/310.

Flowchart 460 continues with registering a timecode status of media content 104/204 when system user 124 is at the location registered in action 463 (action 464). Media content 104/204 may be timecode indexed media content, where the timecode has a granularity of tenths, hundredths, or thousandths of a second, for example. In such an implementation, registering the timecode status of media content 104/204 when system user 124 is at the location registered in action 463 may correspond to reading and storing the timecode of media content 104/204 when system user 124 is at the registered location. Registering the timecode status of media content 104/204 when system user 124 is at the location registered in action 463 may be performed by memory allocation software code 240/340, executed by CPU 214/314 of media content presentation system 110/210/310.

Flowchart 460 continues with identifying second dataset 108/208 of media content 104/204 based on the location and the timecode status registered in respective actions 463 and 464 (action 465). Identification of second dataset 108/208 based on the location and the timecode status registered in respective actions 463 and 464 may be performed by memory allocation software code 240/340, executed by CPU 214/314 of media content presentation system 110/210/310.

As a specific exemplary implementation, in VR use cases, media content 104/204 may be per-viewpoint temporal media content including 3D video frames. Seamless presentation of such per-viewpoint temporal media content 104/204 requires that the next dataset, i.e., second dataset 108/208, be transferred into GPU memory 246 in time for dependent rendering operations. This advantageously avoids potential stalls in a rendering pipeline due to unfinished memory transfers, which can lead to immersion breaking.

According to one implementation, identification of second dataset 108/208 needed for future rendering operations includes determining a clairvoyance window (C) representing a span of frames (F), for the viewpoints that are used for view reconstruction (P). The clairvoyance window, C, defines a unit subset of encoded viewpoint frames that are to be on GPU 244/344 for a given time range and media content 104/204.

The clairvoyance window of each viewpoint, $C_p$, is estimated to ensure that the correct next dataset, i.e., second dataset 108/208 is in GPU memory 246 in time for rendering operations. Given a particular viewpoint $p_i \in P$, $C_{pi}$ is determined using a common time-frame of reference $\varphi$, $1 \leq \varphi \leq \Phi$, where $\Phi$ denotes the entire timecode of media content 104/204. The variable $\varphi$ is analogous to the frame reference for the next reconstructed view-frame. The beginning of $C_{pi}$ is estimated over the course of $\Phi$ given $\varphi$ as $c_\varphi = \varphi - (\varphi \bmod F)$. The last frame in the span of $C_{pi}$ can be determined as $c_\Delta = \min(F, \Phi - c_\varphi)$, which can be determined if the frames spanning $C_{pi}$ have elapsed. From this, the collective subset of frames in C for the set of viewpoints that are used for view reconstruction is defined by:

$$C = C_{p1} + C_{p2} + \ldots + C_{pN}$$

where N is the number of viewpoints that are used for reconstruction, and $C_{pi}$ is defined as $\int_{c\varphi}^{c\Delta} \Phi$. This representation for C is essential for providing support for certain key features in animated light fields such as dynamic video branching.

It follows that the frequency of transfer for a given media content 104/204 is dependent on $$\lambda = \begin{cases} F & \Phi > F \\ \Phi & \Phi \leq F \end{cases}$$

since the frames spanning $C_{pi}$ elapse specifically when $c_\varphi = \varphi$. This ability to control the frequency via $\lambda$ has an additional benefit with regard to performance tuning. It advantageously enables controlling the sizes of the datasets being transferred by tuning for the optimal value of F subject to hardware constraints. This is useful in scenarios where, for example, configurations on high-end desktop computing platforms may not be suitable for lower-powered mobile computing platforms. Moreover, $\lambda$ can be chosen based on the compression rates of a given media content 104/204 to control the sizes of first and second datasets 106/206 and 108/208 being transferred to GPU 2441344. This follows from the fact that datasets with little animation will typically have higher compression ratios than those with more animation.

Flowchart 460 continues with transferring first differential dataset 207 to GPU memory 246 (action 466). It is noted that first differential dataset 207 contains data included in second dataset 108/208 but omitted from first dataset 106/206. Thus, transfer of first differential dataset 207 to GPU memory 246 assures that the contents of second dataset 108/208 are present on GPU memory 246 after the data transfer, while the bandwidth required to perform the data transfer is advantageously minimized.

In one implementation, as shown in FIG. 2, main memory 216 of media content presentation system 210 may serve as a local media content storage for media content 104/204, and may further store first differential dataset 207. First differential dataset 207 may be transferred to GPU memory 246 from main memory 216 via data bus 248. In some implementations, first differential dataset 207 may be determined by memory allocation software code 240/340, executed by CPU 214/314 of media content presentation system 110/210/310. However, in other implementations, first differential dataset 207 may be predetermined through offline analysis of the range of locations and timecodes relevant to the presentation of media content 104/204. First differential dataset 207 may be transferred to GPU memory 246 by memory allocation software code 240/340, executed by CPU 214/314.

Flowchart 460 continues with continuing the seamless presentation of media content 104/204 to system user 124 by GPU 244/344 utilizing at least first differential dataset 207 (action 467). It is noted that, in implementations in which second dataset 108/208 is entirely different from first dataset 106/206, i.e., first differential dataset 207 is substantially equal to second dataset 1081208, the continued seamless presentation of media content 104/204 to system user 124 may be performed using first differential dataset 207 alone. However, in implementations in which there is data overlap between first dataset 106/206 and second dataset 108/208, the continued seamless presentation of media content 104/204 to system user 124 may be performed using first differential dataset 207 and data common to first dataset 106/206 and second dataset 108/208.

It is further noted that the continued seamless presentation of media content 104/204 is enabled by the determination and transfer of first differential dataset 207 into GPU memory 246 before second dataset 108/208 is required for rendering media content 104/204. The continued seamless presentation of media content 104/204 to system user 124 by GPU 244/344 utilizing at least first differential dataset 207 may occur under the control of memory allocation software code 240/340, executed by CPU 214/314 of media content presentation system 110/210/310.

Flowchart 460 can conclude with transferring second differential dataset 209 out of GPU memory 246 during the continued seamless presentation of media content 104/204 to system user 124 by GPU 244/344 utilizing at least first differential dataset 207 (action 468). Second differential dataset 209 contains data included in first dataset 106/206 but omitted from second dataset 1081208. Thus, transfer of second differential dataset 209 out of GPU memory 246 assures that only the contents of second dataset 108/208 needed for continued seamless presentation of media content 104/204 are present on GPU memory 246 after the data transfer, while once again advantageously minimizing the bandwidth required to perform the data transfer.

In one implementation, transferring second differential dataset 209 out of GPU memory 246 may include transferring second differential dataset 209 to main memory 216/316 of media content presentation system 110/210/310. However, in other implementations, transferring second differential dataset 209 out of GPU memory 246 may include transferring second differential dataset 209 to an internal hard drive of computing platform 212/312, or to an external hard drive accessible by computing platform 212/312. Second differential dataset 209 may be transferred out of GPU memory 246 during the continued seamless presentation of media content 104/204 to system user 124, by memory allocation software code 240/340, executed by CPU 214/314 of media content presentation system 110/210/310.

Thus, the present application discloses systems and methods for performing memory allocation for seamless media content presentation. By transferring a first dataset of media content from media content storage to GPU memory, and utilizing the first dataset to begin presentation of the media content to a system user, the present solution ensures that GPU memory resources are not overwhelmed. Moreover, by identifying a second dataset of the media content based on a location of the system user, as well as the time code status of the media content when the system user is at the location, the present solution ensures that the GPU memory is provisioned with the data needed to provide the system user with a seamless media content presentation. When implemented to provide a VR experience to the system user, for example, the present solution can advantageously support an arbitrary number of viewpoints for reconstructing 3D scenes accurately and from substantially any point of view.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content presentation system comprising:
a computing platform having a central processing unit (CPU), a graphics processing unit (GPU) having a GPU memory, and a main memory storing a memory allocation software code;
the CPU configured to execute the memory allocation software code to:
transfer a first dataset of a video content from a media content storage to the GPU memory, wherein the video content is indexed using timecodes of the video content;
seamlessly present the video content to a system user by the GPU utilizing the first dataset, wherein the first dataset presents the video content to the system user from a first viewpoint corresponding to a first location of the system user;
register a second viewpoint of the system user during the seamless presentation of the video content to the system user by the GPU utilizing the first dataset, wherein the second viewpoint is different than the first viewpoint;

register a current timecode of the video content during the seamless presentation of the video content to the system user by the GPU utilizing the first dataset;

identify a second dataset of the video content based on the second viewpoint of the system user and the current timecode of the video content, wherein identifying the second dataset includes determining a window representing a span of frames of the video content for constructing the second viewpoint for a time range based on the current timecode, and wherein the second dataset presents the video content to the system user from the second viewpoint;

transfer a first differential dataset to the GPU memory, the first differential dataset comprising data included in the second dataset but omitted from the first dataset; and continue to seamlessly present the video content to the system user from the second viewpoint by the GPU utilizing at least the first differential dataset.

2. The media content presentation system of claim 1, wherein the media content presentation system comprises a head mounted virtual reality (VR) viewer.

3. The media content presentation system of claim 1, wherein the video content comprises audio-visual content.

4. The media content presentation system of claim 1, wherein the CPU is further configured to execute the memory allocation software code to transfer a second differential dataset out of the GPU memory during the continued seamless presentation of the video content to the system user by the GPU utilizing the at least first differential dataset, wherein the second differential dataset comprises data included in the first dataset but omitted from the second dataset.

5. The media content presentation system of claim 1, wherein transferring the second differential dataset out of the GPU memory comprises transferring the second differential dataset to the main memory of the media content presentation system.

6. The media content presentation system of claim 1, wherein the video content comprises haptic content.

7. The media content presentation system of claim 1, wherein the timecode of the video content has a granularity of at least tenths of a second, up to thousandths of a second.

8. A method for use by a media content presentation system including a computing platform having a central processing unit (CPU), a graphics processing unit (GPU) having a GPU memory, and a main memory storing a memory allocation software code, the method comprising:

transferring, using the CPU, a first dataset of a video content from a media content storage to the GPU memory, wherein the video content is indexed using timecodes of the video content;

seamlessly presenting the video content to a system user by the GPU utilizing the first dataset, wherein the first dataset presents the video content to the system user from a first viewpoint corresponding to a first location of the system user;

registering, using the CPU, a second viewpoint of the system user during the seamless presentation of the video content to the system user by the GPU utilizing the first dataset, wherein the second viewpoint is different than the first viewpoint;

registering, using the CPU, a current timecode of the video content during the seamless presentation of the video content to the system user by the GPU utilizing the first dataset;

identifying, using the CPU, a second dataset of the video content based on the second viewpoint of the system user and the current timecode of the video content, wherein identifying the second dataset includes determining a window representing a span of frames of the video content for constructing the second viewpoint for a time range based on the current timecode, and wherein the second dataset presents the video content to the system user from the second viewpoint;

transferring, using the CPU, a first differential dataset to the GPU memory, the first differential dataset comprising data included in the second dataset but omitted from the first dataset; and continuing to seamlessly present, using the CPU, the video content to the system user from the second viewpoint by the GPU utilizing at least the first differential dataset.

9. The method of claim 8, wherein the media content presentation system comprises a head mounted virtual reality (VR) viewer.

10. The method of claim 8, wherein the video content comprises audio-visual content.

11. The method of claim 8 further comprising:

transferring, using the CPU, a second differential dataset out of the GPU memory during the continued seamless presentation of the media content to the system user by the GPU utilizing the at least first differential dataset;

wherein the second differential dataset comprises data included in the first dataset but omitted from the second dataset.

12. The method of claim 11, wherein transferring the second differential dataset out of the GPU memory comprises transferring the second differential dataset to the main memory of the media content presentation system.

13. The method of claim 8, wherein the video content comprises haptic content.

14. The method of claim 8, wherein the timecode of the video content has a granularity of at least tenths of a second, up to thousandths of a second.

15. A computer-readable non-transitory medium having stored thereon instructions, which when executed by a central processing unit (CPU) of a media content presentation system, instantiate a method comprising:

transferring a first dataset of a video content from a media content storage to the GPU memory, wherein the video content is indexed using timecodes of the video content;

seamlessly presenting the video content to a system user by the GPU utilizing the first dataset, wherein the first dataset presents the video content to the system user from a first viewpoint corresponding to a first location of the system user;

registering a second viewpoint of the system user during the seamless presentation of the video content to the system user by the GPU utilizing the first dataset, wherein the second viewpoint is different than the first viewpoint;

registering a current timecode of the video content during the seamless presentation of the video content to the system user by the GPU utilizing the first dataset;

identifying a second dataset of the video content based on the second viewpoint of the system user and the current timecode of the video content, wherein identifying the second dataset includes determining a window representing a span of frames of the video content for constructing the second viewpoint for a time range based on the current timecode, and wherein the second dataset presents the video content to the system user from the second viewpoint;

transferring a first differential dataset to the GPU memory, the first differential dataset comprising data included in the second dataset but omitted from the first dataset; and continuing to seamlessly present the video content to the system user from the second viewpoint by the GPU utilizing at least the first differential dataset.

16. The computer-readable non-transitory medium of claim 15, wherein the media content presentation system comprises a head mounted virtual reality (VR) viewer.

17. The computer-readable non-transitory medium of claim 15, wherein the video content comprises audio-visual content.

18. The computer-readable non-transitory medium of claim 15, wherein the method further comprises:

transferring, using the CPU, a second differential dataset out of the GPU memory during the continued seamless presentation of the media content to the system user by the GPU utilizing the at least first differential dataset;

wherein the second differential dataset comprises data included in the first dataset but omitted from the second dataset.

19. The computer-readable non-transitory medium of claim 18, wherein transferring the second differential dataset out of the GPU memory comprises transferring the second differential dataset to a main memory of the media content presentation system.

20. The computer-readable non-transitory medium of claim 15, wherein the video content comprises haptic content.

\* \* \* \* \*

UNITED STATES PATENT AND TRADEMARK OFFICE
CERTIFICATE OF CORRECTION

PATENT NO.        : 10,482,570 B2                                     Page 1 of 1
APPLICATION NO.   : 15/716234
DATED             : November 19, 2019
INVENTOR(S)       : Mitchell et al.

It is certified that error appears in the above-identified patent and that said Letters Patent is hereby corrected as shown below:

In the Claims

Column 9, Line 35, "system of claim 1," should be -- system of claim 4, --

Signed and Sealed this
Twenty-first Day of April, 2020

Andrei Iancu
*Director of the United States Patent and Trademark Office*